United States Patent [19]
Endoh

[11] Patent Number: 6,011,257
[45] Date of Patent: Jan. 4, 2000

[54] BOLOMETER INFRARED IMAGE SENSOR WITH AN IMPROVED COMPENSATION CIRCUIT FOR COMPENSATING FIXED PATTERN NOISE

[75] Inventor: Tsutomu Endoh, Tokyo, Japan

[73] Assignee: NEC Corporation, Tokyo, Japan

[21] Appl. No.: 08/844,614

[22] Filed: Apr. 21, 1997

[30] Foreign Application Priority Data

Apr. 19, 1996 [JP] Japan ................................ 8-122163

[51] Int. Cl.⁷ .......................... G12B 13/00; G01J 5/20
[52] U.S. Cl. .................................. 250/252.1; 250/332
[58] Field of Search ............................ 250/252.1, 332

[56] References Cited

U.S. PATENT DOCUMENTS

| | | | |
|---|---|---|---|
| 5,420,421 | 5/1995 | Lindgren et al. | 250/252.1 |
| 5,608,213 | 3/1997 | Punkus et al. | 250/252.1 |
| 5,631,466 | 5/1997 | Botti et al. | 250/332 |
| 5,693,940 | 12/1997 | Botti et al. | 250/252.1 |
| 5,811,808 | 9/1998 | Cannata et al. | 250/332 |

FOREIGN PATENT DOCUMENTS

| | | |
|---|---|---|
| 56-137775 | 10/1981 | Japan . |
| 57-132031 | 8/1982 | Japan . |
| 60-239180 | 11/1985 | Japan . |
| 2-107074 | 4/1990 | Japan . |
| 6-253214 | 9/1994 | Japan . |

*Primary Examiner*—Constantine Hannaher
*Assistant Examiner*—Albert Gagliardi
*Attorney, Agent, or Firm*—Young & Thompson

[57] ABSTRACT

An image sensor includes a plurality of pixels, each of which includes a bolometer infrared image sensor; a feed back circuit connected to the infrared image sensor for controlling at a constant value a current flowing through each the pixels of the infrared image sensor and for generating output voltage signals for each the pixels by apply the current controlled constant to each the pixels; detecting circuit connected to the feed back circuit for detecting variations in the resistance of each the pixels as fixed pattern noises based upon the output voltage signals from the feed back circuit to generate compensation signals which are to be fed back to the feed back circuit for feed-back control of the current flowing through the infrared image sensor.

36 Claims, 5 Drawing Sheets

BOLOMETER INFRARED IMAGE SENSOR WITH AN IMPROVED COMPENSATION CIRCUIT FOR COMPENSATING FIXED PATTERN NOISE

BACKGROUND OF THE INVENTION

The present invention relates to an image sensor, and more particularly to a bolometer infrared image sensor with an improved compensation circuit for compensating fixed pattern noise included in image signals.

Infrared image sensors have dispersions in sensitivity, so-called fixed pattern noise, due to variations of properties of individual pixels. In order to improve picture quality, it is necessary to remove fixed pattern noises included in image signals. Variations of properties of individual pixels are classified into variations in level of biases for every element and variations in sensitivity for every element.

The variations in level of biases for every element have been removed as follows. Under uniform infrared input conditions, fixed pattern noises native to each sensor are first obtained for once storing the same into a memory as fixed pattern noise data so that when any input image data are received, the fixed pattern noise data are fetched from the memory so as to subtract the fixed pattern noise data from the input image data whereby the fixed pattern noises are removed and image data free of fixed pattern noise can be obtained.

On the other hand, the variations in sensitivity for every element have been removed as follows. Output data for quantities of two different incident lights which are uniform in plane are fetched to obtain a difference between them so that the from the difference, gain information is obtained for every element whereby multiplication and subtraction are made for compensation of the variations in sensitivity. This technique is disclosed in the Japanese laid-open patent publication No. 2-107074.

The above conventional compensation circuit needs two circuit configurations for compensation of both the variations in level of the biases for every element and variations in sensitivity for every element. Also, as described above, it is required to execute complicated processes such that output data for quantities of two different incident lights which are uniform in plane are fetched. The compensation of both the variations in level of the biases for every element and variations in sensitivity for every element are carried out in the different two processes.

In the above circumstances, it had been required to develop a novel infrared image sensor capable of compensation of both the variations in level of the biases for every element and variations in sensitivity for every element only by obtaining data one time under uniform infrared ray input conditions.

SUMMARY OF THE INVENTION

Accordingly, it is an object of the present invention to provide a novel infrared image sensor free from the problems as described above.

It is a further object of the present invention to provide a novel infrared image sensor with an improved compensation circuit for compensating fixed pattern noises included in image signals.

It is a further more object of the present invention to provide a novel infrared image sensor with an improved compensation circuit for compensating both the variations in level of the biases for every element and variations in sensitivity for every element only by obtaining data one time under uniform infrared ray input conditions.

It is a still further object of the present invention to provide an improved compensation circuit for compensating fixed pattern noises included in image signals in an infrared image sensor.

It is yet a further object of the present invention to provide an improved compensation circuit in an infrared image sensor for compensating both the variations in level of the biases for every element and variations in sensitivity for every element only by obtaining data one time under uniform infrared ray input conditions.

The above and other objects, features and advantages of the present invention will be apparent from the following descriptions.

The present invention provides a compensation circuit for infrared sensors in pixels included in an image sensor. The compensation circuit comprises the following elements. A detecting circuit is connected to the infrared sensor for detecting variations in resistance of the pixels. The detecting circuit has a controller for controlling a current flowing though the infrared sensor. A storing circuit is connected to the detecting circuit for storing the detected variations in resistance of the pixels as variation data. A calculating circuit is connected to the storing circuit for calculating a variation coefficient for each pixel based upon the variation data. A multiplexing circuit is connected to the calculating circuit for multiplexing the variation coefficient and a reference value having been predetermined to obtain a compensation signal. The multiplexing circuit is also connected to the controller in the detecting circuit for transmitting the compensation signal to the controller for feed-back control of the current flowing through the infrared sensor.

The present invention also provides a compensation circuit for infrared sensors in pixels included in an image sensor. The compensation circuit comprises the following elements. A detecting circuit is connected to the infrared sensor for detecting variations in resistance of the pixels. The detecting circuit has a controller for controlling a current flowing though the infrared sensor. A storing circuit is connected to the detecting circuit for storing the detected variations in resistance of the pixels as variation data to generate a compensation signal. An averaging circuit is connected to the storing circuit for averaging the variation data and the averaging circuit is also connected to the controller in the detecting circuit for transmitting the compensation signal to the controller for feed-back control of the current flowing through the infrared sensor.

The present invention provides a compensation circuit for infrared sensors in pixels included in an image sensor. The compensation circuit comprises the following elements. A feed back circuit is connected to the infrared sensor for controlling at a constant value a current flowing through each the pixels of the infrared sensor and for generating output voltage signals for each the pixels by apply the current controlled constant to each the pixels. A detecting circuit is connected to the feed back circuit for detecting variations in the resistance of each the pixels as fixed pattern noises based upon the output voltage signals from the feed back circuit to generate compensations signals which are to be fed back to the feed back circuit for feed-back control of the current flowing through the infrared sensor.

The present invention also provides an image sensor comprising the following elements. A plurality of pixels are provided, each of which includes a bolometer infrared image sensor. A detecting circuit is connected to the infrared image sensor for detecting variations in resistance of the pixels. The detecting circuit has a controller for controlling a current flowing though the infrared image sensor. A storing circuit is connected to the detecting circuit for storing the detected variations in resistance of the pixels as variation data. A calculating circuit is connected to the storing circuit for calculating a variation coefficient for each pixel based upon the variation data. A multiplexing circuit is connected to the calculating circuit for multiplexing the variation coefficient and a reference value having been predetermined to obtain a compensation signal. The multiplexing circuit is also connected to the controller in the detecting circuit for transmitting the compensation signal to the controller for feed-back control of the current flowing through the infrared image sensor.

The present invention also provides an image sensor comprising the following elements. A plurality of pixels are provided, each of which includes a bolometer infrared image sensor. A detecting circuit is connected to the infrared image sensor for detecting variations in resistance of the pixels. The detecting circuit has a controller for controlling a current flowing though the infrared image sensor. A storing circuit is connected to the detecting circuit for storing the detected variations in resistance of the pixels as variation data to generate a compensation signal. An averaging circuit is connected to the storing circuit for averaging the variation data and the averaging circuit is also connected to the controller in the detecting circuit for transmitting the compensation signal to the controller for feed-back control of the current flowing through the infrared image sensor.

The present invention also provides an image sensor comprising the following elements. A plurality of pixels are provided, each of which includes a bolometer infrared image sensor. A feed back circuit is connected to the infrared image sensor for controlling at a constant value a current flowing through each the pixels of the infrared image sensor and for generating output voltage signals for each the pixels by applying the current controlled constant to each the pixels. A detecting circuit is connected to the feed back circuit for detecting variations in the resistance of each the pixels as fixed pattern noises based upon the output voltage signals from the feed back circuit to generate compensations signals which are to be fed back to the feed back circuit for feed-back control of the current flowing through the infrared image sensor.

BRIEF DESCRIPTIONS OF THE DRAWINGS

Preferred embodiments of the present invention will be described in detail with reference to the accompanying drawings.

DISCLOSURE OF THE INVENTION

Figure 1:
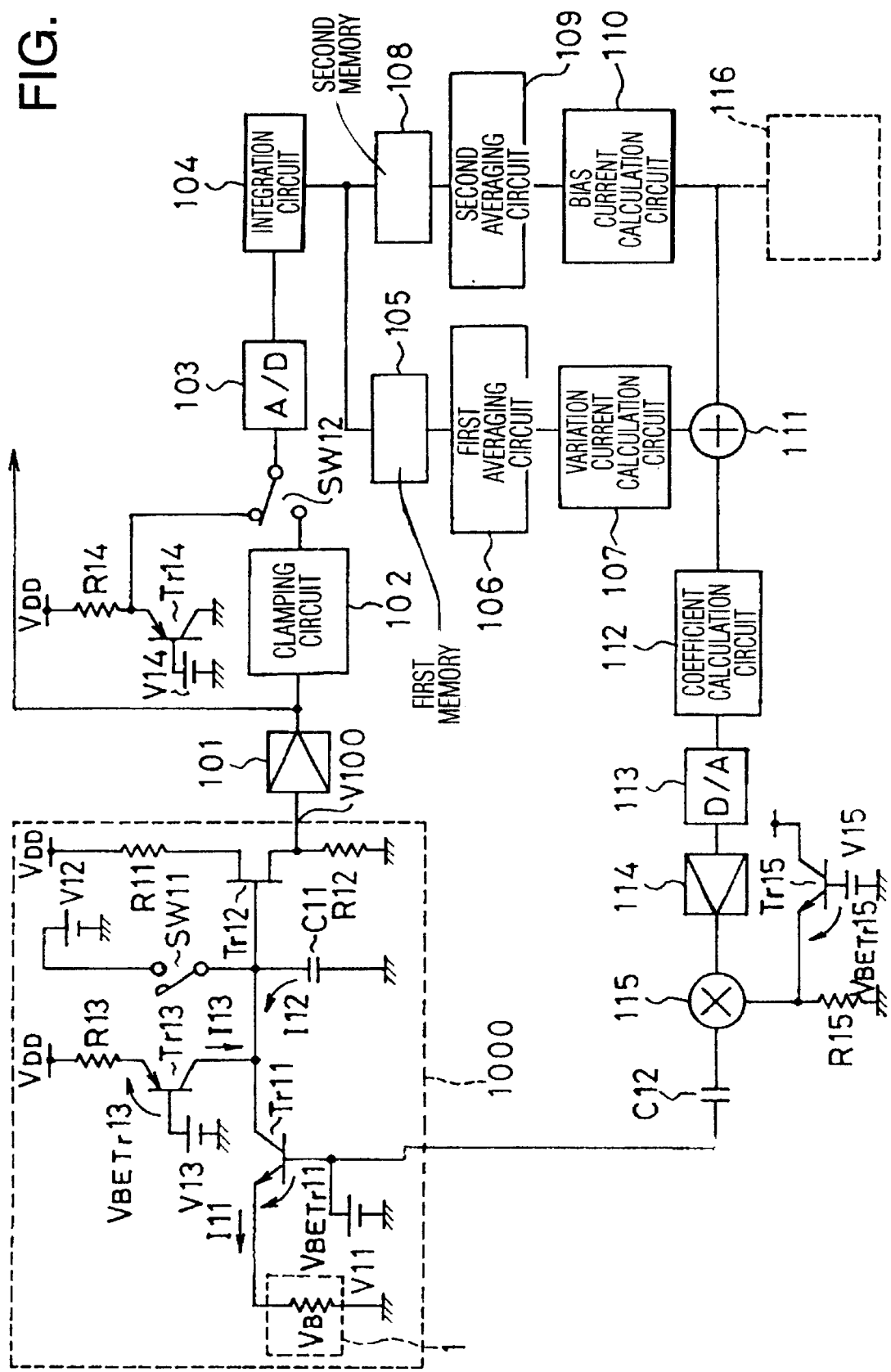
FIG. 1 is a circuit diagram illustrative of a compensation circuit for bolometer infrared image sensors in a first embodiment according to the present invention.

The present invention provides a compensation circuit for infrared sensors in pixels included in an image sensor. The compensation circuit comprises the following elements. A detecting circuit is connected to the infrared sensor for detecting variations in resistance of the pixels. The detecting circuit has a controller for controlling a current flowing though the infrared sensor. A storing circuit is connected to the detecting circuit for storing the detected variations in resistance of the pixels as variation data. A calculating circuit is connected to the storing circuit for calculating a variation coefficient for each pixel based upon the variation data. A multiplexing circuit is connected to the calculating circuit for multiplexing the variation coefficient and a reference value having been predetermined to obtain a compensation signal. The multiplexing circuit is also connected to the controller in the detecting circuit for transmitting the compensation signal to the controller for feed-back control of the current flowing through the infrared sensor.

It is preferable that the detecting circuit comprises the following elements. A reading out circuit is connected to the infrared sensor for reading out output signals for every pixels from the infrared sensor. An analog-to-digital converter is connected to the reading out circuit for conducting an analog-to-digital conversion of the output signals into digital signals. An integration circuit is connected to the analog-to-digital converter for integration of the digital signals and the integration circuit being also connected to the storing circuit.

It is also preferable that the reading out circuit comprises an integration circuit which is connected to the infrared sensor and the controller further comprises a transistor having a base connected to the multiplexing circuit for receiving the compensation signal from the multiplexing circuit.

It is also preferable to further provide a constant current circuit connected through a switch to the analog-to-digital converter, wherein the storing circuit comprises a first memory storing results of integration of the digital signals from the integration circuit when the switch connects the analog-to-digital converter to the reading out circuit, and a second memory storing results of integration of the digital signals from the integration circuit when the switch connects the analog-to-digital converter to the constant current circuit. The calculating circuit also comprises the following elements. A first averaging circuit is connected to the first memory for fetching the results of integration from the first memory and averaging the results. A second averaging circuit is connected to the second memory for fetching the results of integration from the second memory and averaging the results. A variation current calculating circuit is connected to the first averaging circuit for calculating a variation current based upon the results averaged by the first averaging circuit. A bias current calculating circuit is connected to the second averaging circuit for calculating a bias current based upon the results averaged by the second averaging circuit. An adder is connected to the variation current calculating circuit and the bias current calculating circuit for adding the variation current to the bias current to obtain total currents for individual pixels. A variation coefficient calculating circuit is connected to the adder for calculating variation coefficients of the total currents. A digital-to-analog converter is connected to the variation coefficient calculating circuit for conducting a digital-to-analog conversion of the variation coefficients into compensation signals. The digital-to-analog converter is also connected to the multiplexing circuit.

It is also preferable that the reading out circuit comprises an integration circuit which is connected to the infrared sensor and has the controller and the controller further comprises a transistor having a base connected to the multiplexing circuit for receiving the compensation signal from the multiplexing circuit, and further it is preferable to provide an emitter follower circuit connected to the multiplexing circuit for supplying the multiplexing circuit with the same voltage as an emitter voltage of the transistor in the integration circuit.

It is also preferable that the storing circuit comprises a first memory storing results of integration of the digital signals from the integration circuit, and also preferable that the calculating circuit comprises the following elements. A first averaging circuit is connected to the first memory for fetching the results of integration from the first memory and averaging the results. A variation coefficient calculating circuit is connected to the first averaging circuit for calculating variation coefficients of the results of integration averaged. A digital-to-analog converter is connected to the variation coefficient calculating circuit for conducting a digital-to-analog conversion of the variation coefficients into compensation signals. The digital-to-analog converter is also connected to the multiplexing circuit.

It is also preferable that the reading out circuit comprises an integration circuit which is connected to the infrared sensor and the controller further comprises a transistor having a base connected to the multiplexing circuit for receiving the compensation signal from the multiplexing circuit, and also preferable to further provide an emitter follower circuit connected to the multiplexing circuit for supplying the multiplexing circuit with the same voltage as an emitter voltage of the transistor in the integration circuit.

The present invention also provides a compensation circuit for infrared sensors in pixels included in an image sensor. The compensation circuit comprises the following elements. A detecting circuit is connected to the infrared sensor for detecting variations in resistance of the pixels. The detecting circuit has a controller for controlling a current flowing though the infrared sensor. A storing circuit is connected to the detecting circuit for storing the detected variations in resistance of the pixels as variation data to generate a compensation signal. An averaging circuit is connected to the storing circuit for averaging the variation data and the averaging circuit is also connected to the controller in the detecting circuit for transmitting the compensation signal to the controller for feed-back control of the current flowing through the infrared sensor.

It is preferable that the detecting circuit comprises the following elements. A reading out circuit is connected to the infrared sensor for reading out output signals for every pixels from the infrared sensor. An analog-to-digital converter is connected to the reading out circuit for conducting an analog-to-digital conversion of the output signals into digital signals. An integration circuit is connected to the analog-to-digital converter for integration of the digital signals and the integration circuit being also connected to the storing circuit.

It is also preferable that the reading out circuit comprises an integration circuit which is connected to the infrared sensor and the controller further comprises a transistor having a base connected to the averaging circuit for receiving the compensation signal from the averaging circuit.

It is also preferable to further provide a digital-to-analog converter being connected to the variation coefficient calculating circuit for conducting a digital-to-analog conversion of the variation coefficients into compensation signals, and the digital-to-analog converter is also connected to the base of the transistor serving as the controller.

The present invention also provides a compensation circuit for infrared sensors in pixels included in an image sensor. The compensation circuit comprises the following elements. A feed back circuit is connected to the infrared sensor for controlling at a constant value a current flowing through each the pixels of the infrared sensor and for generating output voltage signals for each the pixels by applying the current controlled constant to each the pixels. A detecting circuit is connected to the feed back circuit for detecting variations in the resistance of each the pixels as fixed pattern noises based upon the output voltage signals from the feed back circuit to generate compensations signals which are to be fed back to the feed back circuit for feed-back control of the current flowing through the infrared sensor.

It is also preferable that the detecting circuit comprises the following elements. An analog-to-digital converter is connected to the feed back circuit for conducting an analog-to-digital conversion of the output voltage signals into digital voltage signals. An integration circuit is connected to the analog-to-digital converter for integration of the digital voltage signals. A storing circuit is connected to the detecting circuit for storing the integration of the digital voltage signals as variation data. A variation coefficient calculating circuit is connected to the storing circuit for calculating a variation coefficient for each pixel based upon the variation data. A digital-to-analog converter is connected to the variation coefficient calculating circuit for conducting a digital-to-analog conversion of the variation coefficients into variation coefficient analog signals. A multiplexing circuit is connected to the digital-to-analog converter for multiplexing the variation coefficient analog signals and a reference value having been predetermined to obtain a compensation signal. The multiplexing circuit is also connected to the feed back circuit for transmitting the compensation signal to the feed back circuit.

It is also preferable that the feed back circuit comprises an integration circuit which is connected to the infrared sensor and the controller further comprises a transistor having a base connected to the multiplexing circuit for receiving the compensation signal from the multiplexing circuit, and further preferable to provide an emitter follower circuit connected to the multiplexing circuit for supplying the multiplexing circuit with the same voltage as an emitter voltage of the transistor in the integration circuit.

It is also preferable to further provide a constant current circuit connected through a switch to the analog-to-digital converter, wherein the storing circuit comprises a first memory storing results of integration of the digital signals from the integration circuit when the switch connects the analog-to-digital converter to the feed back circuit, and a second memory storing results of integration of the digital signals from the integration circuit when the switch connects the analog-to-digital converter to the constant current circuit. The variation coefficient calculating circuit also comprises the following elements. A first averaging circuit is connected to the first memory for fetching the results of integration from the first memory and averaging the results. A second averaging circuit is connected to the second memory for fetching the results of integration from the second memory and averaging the results. A variation current calculating circuit is connected to the first averaging circuit for calculating a variation current based upon the results averaged by the first averaging circuit. A bias current calculating circuit is connected to the second averaging circuit for calculating a bias current based upon the results averaged by the second averaging circuit. An adder is connected to the variation current calculating circuit and the bias current calculating circuit for adding the variation current to the bias current to obtain total currents for individual pixels. A variation coefficient calculating circuit is connected to the adder for calculating variation coefficients of the total currents.

It is preferable that the storing circuit comprises a first memory storing results of integration of the digital signals from the integration circuit, and also preferable that the calculating circuit comprises a first averaging circuit connected to the first memory for fetching the results of integration from the first memory and averaging the results, and a variation coefficient calculating circuit being connected to the first averaging circuit for calculating variation coefficients of the results of integration averaged.

It is also preferable that the detecting circuit comprises the following elements. An analog-to-digital converter is connected to the feed back circuit for conducting an analog-to-digital conversion of the output voltage signals into digital voltage signals. An integration circuit is connected to the analog-to-digital converter for integration of the digital voltage signals. A storing circuit is connected to the detecting circuit for storing the integration of the digital voltage signals as variation data. An averaging circuit is connected to the storing circuit for averaging the variation data. A digital-to-analog converter is connected to the averaging circuit for conducting a digital-to-analog conversion of the averaged variation data into analog signals. The digital-to-analog converter is also connected to the feed back circuit.

It is also preferable that the feed back circuit comprises an integration circuit which is connected to the infrared sensor and the controller further comprises a transistor having a base connected to the digital-to-analog converter.

The present invention also provides an image sensor comprising the following elements. A plurality of pixels are provided, each of which includes a bolometer infrared image sensor. A detecting circuit is connected to the infrared image sensor for detecting variations in resistance of the pixels. The detecting circuit has a controller for controlling a current flowing though the infrared image sensor. A storing circuit is connected to the detecting circuit for storing the detected variations in resistance of the pixels as variation data. A calculating circuit is connected to the storing circuit for calculating a variation coefficient for each pixel based upon the variation data. A multiplexing circuit is connected to the calculating circuit for multiplexing the variation coefficient and a reference value having been predetermined to obtain a compensation signal. The multiplexing circuit is also connected to the controller in the detecting circuit for transmitting the compensation signal to the controller for feed-back control of the current flowing through the infrared image sensor.

It is preferable that the detecting circuit comprises the following elements. A reading out circuit is connected to the infrared image sensor for reading out output signals for every pixels from the infrared image sensor. An analog-to-digital converter is connected to the reading out circuit for conducting an analog-to-digital conversion of the output signals into digital signals. An integration circuit is connected to the analog-to-digital converter for integration of the digital signals and the integration circuit being also connected to the storing circuit.

It is also preferable that the reading out circuit comprises an integration circuit which is connected to the infrared image sensor and the controller further comprises a transistor having a base connected to the multiplexing circuit for receiving the compensation signal from the multiplexing circuit.

It is also preferable to further provide a constant current circuit connected through a switch to the analog-to-digital converter, wherein the storing circuit comprises a first memory storing results of integration of the digital signals from the integration circuit when the switch connects the analog-to-digital converter to the reading out circuit, and a second memory storing results of integration of the digital signals from the integration circuit when the switch connects the analog-to-digital converter to the constant current circuit. The calculating circuit also comprises the following elements. A first averaging circuit is connected to the first memory for fetching the results of integration from the first memory and averaging the results. A second averaging circuit is connected to the second memory for fetching the results of integration from the second memory and averaging the results. A variation current calculating circuit is connected to the first averaging circuit for calculating a variation current based upon the results averaged by the first averaging circuit. A bias current calculating circuit is connected to the second averaging circuit for calculating a bias current based upon the results averaged by the second averaging circuit. An adder is connected to the variation current calculating circuit and the bias current calculating circuit for adding the variation current to the bias current to obtain total currents for individual pixels. A variation coefficient calculating circuit is connected to the adder for calculating variation coefficients of the total currents. A digital-to-analog converter is connected to the variation coefficient calculating circuit for conducting a digital-to-analog conversion of the variation coefficients into compensation signals. The digital-to-analog converter is also connected to the multiplexing circuit.

It is also preferable that the reading out circuit comprises an integration circuit which is connected to the infrared image sensor and has the controller and the controller further comprises a transistor having a base connected to the multiplexing circuit for receiving the compensation signal from the multiplexing circuit, and further provide an emitter follower circuit connected to the multiplexing circuit for supplying the multiplexing circuit with the same voltage as an emitter voltage of the transistor in the integration circuit.

It is also preferable that the storing circuit comprises a first memory storing results of integration of the digital signals from the integration circuit. The calculating circuit also comprises the following elements. A first averaging circuit is connected to the first memory for fetching the results of integration from the first memory and averaging the results. A variation coefficient calculating circuit is connected to the first averaging circuit for calculating variation coefficients of the results of integration averaged. A digital-to-analog converter is connected to the variation coefficient calculating circuit for conducting a digital-to-analog conversion of the variation coefficients into compensation signals. The digital-to-analog converter is also connected to the multiplexing circuit.

It is also preferable that the reading out circuit comprises an integration circuit which is connected to the infrared image sensor and the controller further comprises a transistor having a base connected to the multiplexing circuit for receiving the compensation signal from the multiplexing circuit, and further preferable to provide an emitter follower circuit connected to the multiplexing circuit for supplying the multiplexing circuit with the same voltage as an emitter voltage of the transistor in the integration circuit.

The present invention also provides an image sensor comprising the following elements. A plurality of pixels are provided, each of which includes a bolometer infrared image sensor. A detecting circuit is connected to the infrared image sensor for detecting variations in resistance of the pixels. The detecting circuit has a controller for controlling a current flowing though the infrared image sensor. A storing circuit is connected to the detecting circuit for storing the detected variations in resistance of the pixels as variation data to generate a compensation signal. An averaging circuit is connected to the storing circuit for averaging the variation data and the averaging circuit is also connected to the controller in the detecting circuit for transmitting the compensation signal to the controller for feed-back control of the current flowing through the infrared image sensor.

It is also preferable that the detecting circuit comprises the following elements. A reading out circuit is connected to the infrared image sensor for reading out output signals for every pixels from the infrared image sensor. An analog-to-digital converter is connected to the reading out circuit for conducting an analog-to-digital conversion of the output signals into digital signals. An integration circuit is connected to the analog-to-digital converter for integration of the digital signals and the integration circuit being also connected to the storing circuit.

It is also preferable that the reading out circuit comprises an integration circuit which is connected to the infrared image sensor and the controller further comprises a transistor having a base connected to the averaging circuit for receiving the compensation signal from the averaging circuit.

It is also preferable to further provide a digital-to-analog converter being connected to the variation coefficient calculating circuit for conducting a digital-to-analog conversion of the variation coefficients into compensation signals, and the digital-to-analog converter is also connected to the base of the transistor serving as the controller.

The present invention also provides an image sensor comprising the following elements. A plurality of pixels are provided, each of which includes a bolometer infrared image sensor. A feed back circuit is connected to the infrared image sensor for controlling at a constant value a current flowing through each the pixels of the infrared image sensor and for generating output voltage signals for each the pixels by applying the current controlled constant to each the pixels. A detecting circuit is connected to the feed back circuit for detecting variations in the resistance of each the pixels as fixed pattern noises based upon the output voltage signals from the feed back circuit to generate compensations signals which are to be fed back to the feed back circuit for feed-back control of the current flowing through the infrared image sensor.

It is also preferable that the detecting circuit comprises the following elements. An analog-to-digital converter is connected to the feed back circuit for conducting an analog-to-digital conversion of the output voltage signals into digital voltage signals. An integration circuit is connected to the analog-to-digital converter for integration of the digital voltage signals. A storing circuit is connected to the detecting circuit for storing the integration of the digital voltage signals as variation data. A variation coefficient calculating circuit is connected to the storing circuit for calculating a variation coefficient for each pixel based upon the variation data. A digital-to-analog converter is connected to the variation coefficient calculating circuit for conducting a digital-to-analog conversion of the variation coefficients into variation coefficient analog signals. A multiplexing circuit is connected to the digital-to-analog converter for multiplexing the variation coefficient analog signals and a reference value having been predetermined to obtain a compensation signal. The multiplexing circuit is also connected to the feed back circuit for transmitting the compensation signal to the feed back circuit.

It is also preferable that the feed back circuit comprises an integration circuit which is connected to the infrared image sensor and the controller further comprises a transistor having a base connected to the multiplexing circuit for receiving the compensation signal from the multiplexing circuit, and preferable to further provide an emitter follower circuit connected to the multiplexing circuit for supplying the multiplexing circuit with the same voltage as an emitter voltage of the transistor in the integration circuit.

It is also preferable to further provide a constant current circuit connected through a switch to the analog-to-digital converter, wherein the storing circuit comprises a first memory storing results of integration of the digital signals from the integration circuit when the switch connects the analog-to-digital converter to the feed back circuit, and a second memory storing results of integration of the digital signals from the integration circuit when the switch connects the analog-to-digital converter to the constant current circuit. The variation coefficient calculating circuit also comprises the following elements. A first averaging circuit is connected to the first memory for fetching the results of integration from the first memory and averaging the results. A second averaging circuit is connected to the second memory for fetching the results of integration from the second memory and averaging the results. A variation current calculating circuit is connected to the first averaging circuit for calculating a variation current based upon the results averaged by the first averaging circuit. A bias current calculating circuit is connected to the second averaging circuit for calculating a bias current based upon the results averaged by the second averaging circuit. An adder is connected to the variation current calculating circuit and the bias current calculating circuit for adding the variation current to the bias current to obtain total currents for individual pixels. A variation coefficient calculating circuit is connected to the adder for calculating variation coefficients of the total currents.

It is also preferable that the storing circuit comprises a first memory storing results of integration of the digital signals from the integration circuit. The calculating circuit also comprises a first averaging circuit connected to the first memory for fetching the results of integration from the first memory and averaging the results, and a variation coefficient calculating circuit being connected to the first averaging circuit for calculating variation coefficients of the results of integration averaged.

It is also preferable that the detecting circuit comprises the following elements. An analog-to-digital converter is connected to the feed back circuit for conducting an analog-to-digital conversion of the output voltage signals into digital voltage signals. An integration circuit is connected to the analog-to-digital converter for integration of the digital voltage signals. A storing circuit is connected to the detecting circuit for storing the integration of the digital voltage signals as variation data. An averaging circuit is connected to the storing circuit for averaging the variation data. A digital-to-analog converter is connected to the averaging circuit for conducting a digital-to-analog conversion of the averaged variation data into analog signals. The digital-to-analog converter is also connected to the feed back circuit.

It is also preferable that the feed back circuit comprises an integration circuit which is connected to the infrared image sensor and the controller further comprises a transistor having a base connected to the digital-to-analog converter.

PREFERRED EMBODIMENTS

A first embodiment according to the present invention will be described wherein provision is made of a novel infrared image sensor with an improved compensation circuit for compensating both the variations in level of the biases for every elements and variations in sensitivity for every elements only by obtaining data one time under uniform infrared ray input conditions. Namely, under the uniform infrared input condition, variations in resistance of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

As illustrated in FIG. 1, the compensation circuit for compensating both the variations in level of the biases for every elements and variations in sensitivity for every elements only by obtaining data one time under uniform infrared ray input conditions comprises an integration circuit 1000 for reading out signals from a bolometer infrared image sensor 1, memory devices 105 and 108 for storing the red-out signals, and a variation coefficient calculation circuit 112 for calculating variation coefficient from the variations in resistance. The calculated variation coefficient is fed back to the integration circuit 1000.

Variations in resistance of individual pixels of the bolometer infrared image sensor 1 are calculated from output voltages from the integration circuit 1000 without use of any further measuring circuit.

In the bolometer infrared image sensor 1, the variations in resistance of the individual pixels of the bolometer infrared image sensor 1 are the main factor which cause the fixed pattern noise. Further, since the sensitivity is proportional to the resistance value, the variation in resistance causes the variation in sensitive.

Under the uniform infrared input condition, variations in resistance of the individual pixels of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

Differently from the prior art, it is not required to execute complicated processes such that output data for quantities of two different incident lights which are uniform in plane are fetched. Also it is not required to carry out in the different two processes the compensations of both the variations in level of the biases for every elements and variations in sensitivity for every elements.

With reference to FIG. 1, in the integration circuit, the bolometer infrared image sensor 1 is connected to an emitter of an integration transistor Tr11. Based upon a base voltage V11 of the integration transistor Tr11, a current I11 flows from the emitter to the bolometer infrared image sensor 1. The current I11 is given by the following equation.

$$I11 = \{(V11 - Vbetr11)/RB\} \quad (1)$$

where V11 is the base voltage of the integration transistor Tr11, Vbetr11 is the base-emitter voltage of the integration transistor Tr11, and RB is the resistance of the bolometer infrared image sensor 1.

The current I11 comprises a discharge current I12 and a bias current I13. The discharge current I12 flows to a collector of the integration transistor Tr11 from an integration capacitor C11 which is connected to the collector of the integration transistor Tr11. The bias current I13 flows through a constant current circuit which comprises a series connection of a resistance R13 and a transistor Tr13 to the collector of the integration transistor Tr11. The resistance R13 is connected between a high voltage line Vdd and an emitter of the transistor Tr13. The collector of the transistor Tr13 is connected to the collector of the integration transistor Tr11. A base of the transistor Tr13 is connected to a bias power source V13 for receipt of a bias voltage from the bias power source V13. The potential of the integration capacitor C11 is reset at the same voltage as a reset voltage V12 by a switch 11 during every reset time periods.

A source-follower circuit is provided in the integration circuit 1000. The source-follower circuit comprises a series connection of a resistance R11, a field effect transistor Tr12 and a resistance R12. The resistance R11 is connected between the high voltage line Vdd and the field effect transistor Tr12. The resistance R12 is connected between the ground line Vdd and the field effect transistor Tr12. A gate of the field effect transistor Tr12 is connected to the collector of the integration transistor Tr11.

The integration circuit 1000 comprises the foregoing elements.

An output voltage signal V100 of the integration circuit 1000 is fed to a first amplifier 101 which is connected to an output side of the integration circuit 1000. The output voltage signal V100 is then transmitted through a clamping circuit 102 and a switch SW12 to an analog-to-digital converter 103 where the output voltage signal V100 is analog-to-digital converted into digital signals. The digital signals are inputted into an integration circuit 104 where signals of several tens of frames are integrated. The integrated results are stored in a first memory 105. A constant current circuit is provided which comprises a series connection of a resistance R14 and a transistor Tr14. The resistance R14 is connected between an emitter of the transistor Tr14 and the high voltage line Vdd. A collector of the transistor Tr14 is connected to the ground line. A base of the transistor Tr14 is connected to a bias power source V14 for receipt of a bias voltage from the bias power source V14. The bias voltage from the bias power source V14 is the same as that from the bias power source V13. The emitter voltage of the transistor Tr14 is transmitted through the switch SW12 to the analog-to-digital converter 103 where the emitter voltage signal is analog-to-digital converted into digital signals. The digital signals are inputted into the integration circuit 104 where signals of several tens of frames are integrated. The integrated results are stored in a second memory 108.

The data once stored in the first and second memories 105 and 108 are then transmitted to first and second averaging circuits 106 and 109 respectively where the data are averaged. The first and second averaged data are then transmitted from the first and second averaging circuits 106 and 109 to a variation current calculation circuit 107 and a bias current calculation circuit 110 respectively so that the variation current calculation circuit 107 calculates variation current from the output voltage signal V100 whilst the bias current calculation circuit 110 calculates a current from the emitter voltage of the transistor Tr14. Both the calculated currents are then transmitted from the variation current calculation circuit 107 and the bias current calculation circuit 110 into an adder 111 for addition of both the calculated currents thereby calculating a current which flows through each pixel. The calculated current which flows through each pixel is transmitted to a coefficient calculation circuit 112 where variations of the current applied to individual pixels from the averaged value of the currents applied to every pixels are calculated as a variation coefficient.

The variation coefficient is then transmitted into a digital-to-analog converter 113 where the variation coefficient is digital-to-analog converted into an analog signal. The analog signal is then transmitted through a second amplifier 114 into a multiplier 115.

Another input of the multiplier 115 is connected to an emitter-follower circuit which comprises a resistance R15, a transistor Tr15. A collector of the transistor Tr15 is connected to the high voltage line Vdd. An emitter of the transistor Tr15 is connected to the other input of the multiplier 115. A base of the transistor Tr15 is connected to a bias power source V15. A base voltage V15 of the transistor Tr15 is the same as the base voltage of the integration transistor Tr11. The resistance R15 is connected between the emitter of the transistor Tr15 and the ground line.

An output of the multiplier 115 is transmitted through a capacitor C12 to a base of the integration transistor Tr11 for execution of feed-back control.

Figure 2:
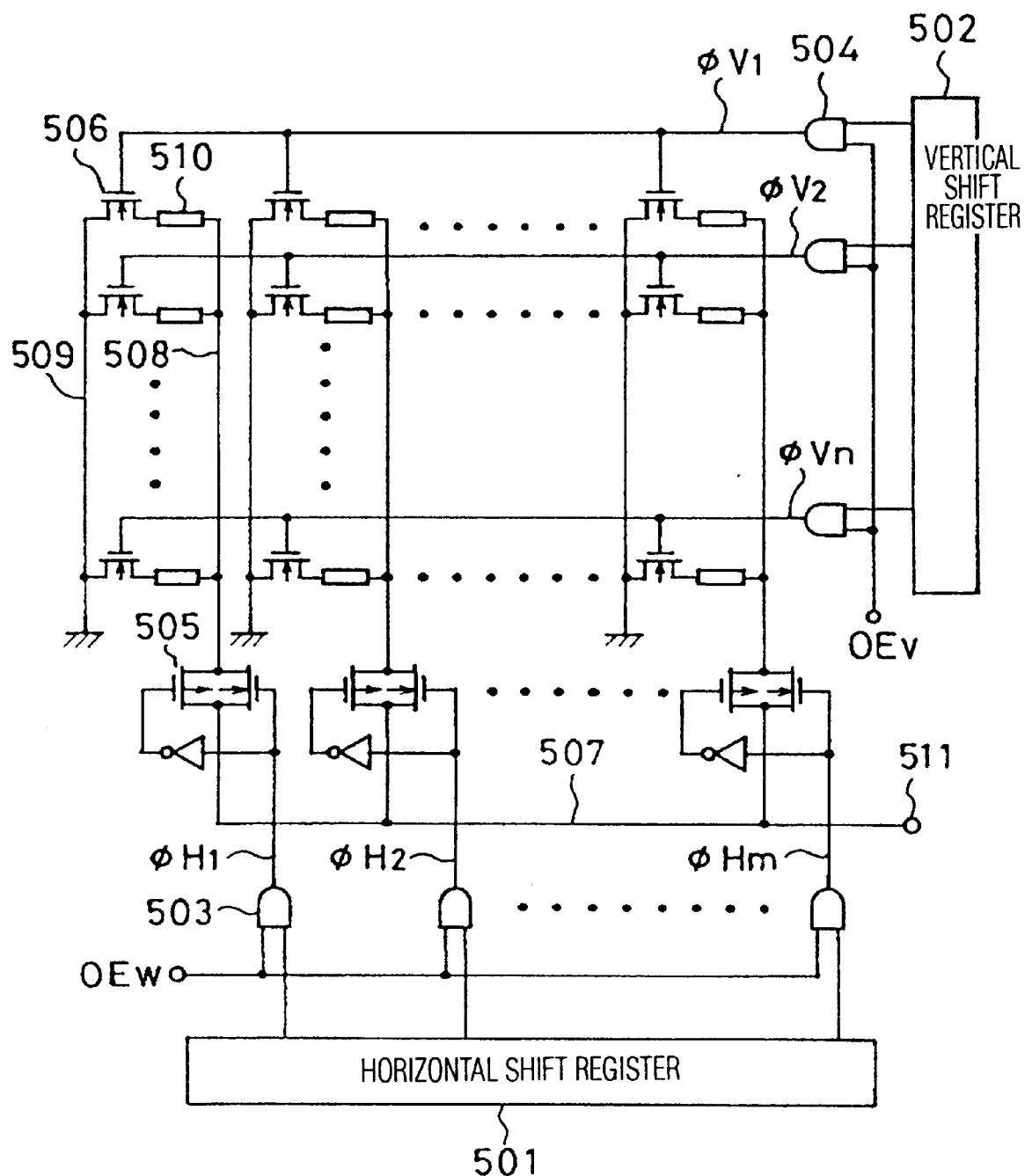
FIG. 2 is a circuit diagram illustrative of a bolometer infrared image sensor in a first embodiment according to the present invention.

FIG. 2 is a circuit diagram illustrative of a bolometer infrared image sensor. The bolometer infrared image sensor has a horizontal shift resistor 501, a vertical shift resistor 502, horizontal AND gates 503, vertical AND gates 504, horizontal switches 505, vertical switches 506, a horizontal signal line 507, vertical signal lines 508, common source lines 509, bolometers 510 and an output terminal 511. Between the vertical signal line 508 and the common source line 509 adjacent to the vertical signal line 508, a pair of the bolometer 510 and a field effect transistor are connected in series. The vertical AND gates 504 are provided to receive outputs of corresponding stage from the vertical shift resistor 502 and a vertical output enable signal OEv. Outputs of the vertical AND gates 504 are transmitted on signal lines into gates of the transistors which are provided along with the bolometers 510 between the vertical signal line 508 and the common source line 509. The field effect transistors are controlled by the outputs from the vertical AND gates 504. The horizontal AND gates 503 are provided to receive outputs of corresponding stage from the horizontal shift resistor 501 and a horizontal output enable signal OEh. Outputs of the horizontal AND gates 503 are transmitted on signal lines H1, H2, - - - Hm, into the horizontal switches 505 for controlling ON/OFF operations of the horizontal switches 505. The horizontal switches 505 are provided between the horizontal and vertical signal lines 507, 508. The horizontal switches 505 comprise CMOS transfer gates.

In the bolometer infrared image sensor, every pixels are sequentially selected by the horizontal and vertical shift resistors 501 and 502, and the horizontal and vertical switches 505 and 506. Output of the every pixels are sequentially transmitted through the vertical signal lines 508 and the horizontal signal lines 509 to the output terminal 511.

Figure 3:
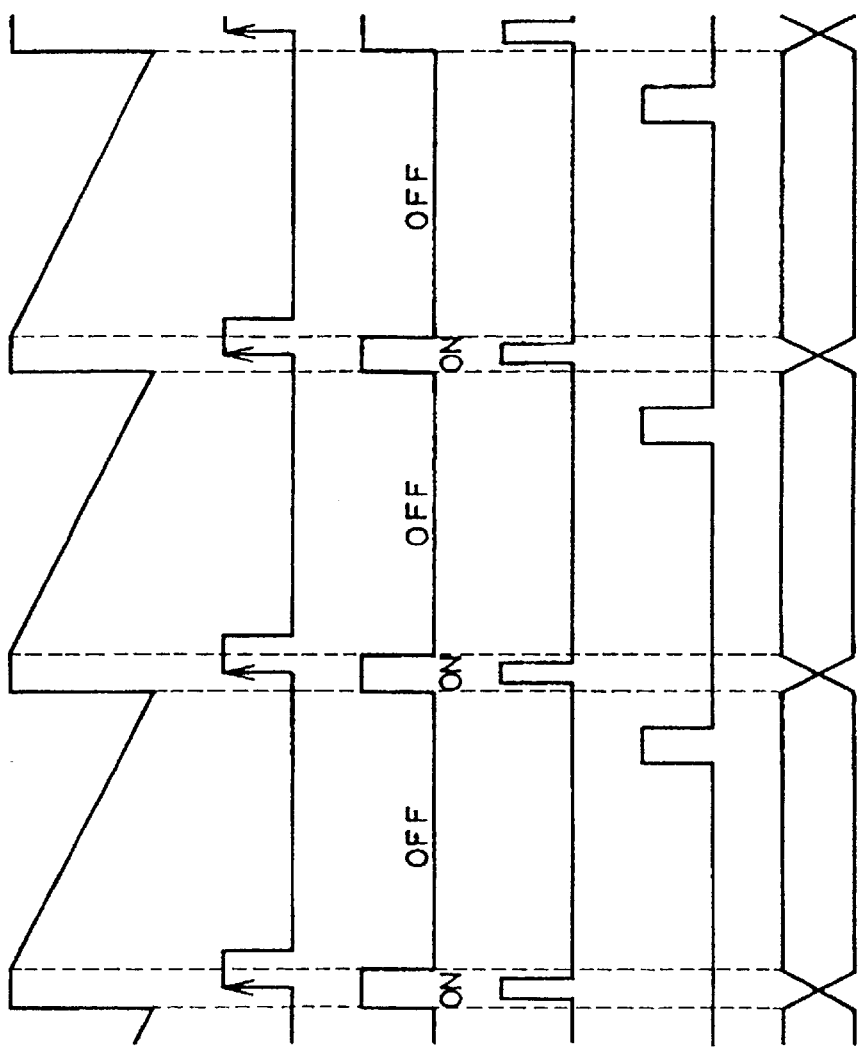
FIG. 3 is a diagram illustrative of waveforms of various signals for operations of a compensation circuit for bolometer infrared image sensors in a first embodiment according to the present invention. page 7

FIG. 3 is a diagram illustrative of waveforms of an output V100 of the integration circuit, a clock signal of the bolometer infrared image sensor 1, a reset switch control pulse for controlling switching operations of the reset switch SW11, a clamp pulse of the clamp circuit 102, an analog-to-digital converter control pulse for controlling the analog-to-digital converter A/D 103, and an output of a digital-to-analog converter D/A 113.

During the ON-period where the reset switch control pulse for controlling switching operations of the reset switch SW11 is in the ON state, the pixels are switched by the clock signal of the bolometer infrared image sensor 1. The output V100 of the integration circuit represents variations in voltage of the integration capacitor C11. During the ON-period of the reset switch control pulse for controlling switching operations of the reset switch SW11, the voltage of the integration capacitor C11 is reset at the reset voltage V12. During the OFF-period of the reset switch control pulse for controlling switching operations of the reset switch SW11, the discharge current from the integration capacitor C11 flows through the bolometer infrared image sensor 1.

The output V100 of the integration circuit is given by the following equation.

$$V100 = I12 t / C \tag{2}$$

where I12 is the discharge current from the integration capacitor C11, t is the integration time or the OFF-period of the reset switch control pulse, and C is the capacitance of the integration capacitor C11.

Under the base voltage V11 of the integration transistor Tr11 being constant, if the resistance values RB of the individual pixels of the bolometer infrared image sensor 1 are dispersed, then since the discharge currents I12 from the integration capacitor C11 are different for every pixel, the output V100 of the integration circuit is also varied whereby the fixed pattern noises are thus generated.

In order to compensate the fixed pattern noises generated, data are obtained which represent variations in resistance value RB of the bolometer infrared image sensor 1 under a uniform infrared input condition so that from those data variation coefficients of the resistance values from the average resistance value are calculated to prepare fixed pattern noise compensation signals.

The fixed pattern noise compensation signals are then fed back to the control voltage for controlling the currents flowing through the bolometer so that a constant current flows independently from the variations in resistance of the individual pixels of the bolometer infrared image sensor 1 thereby compensating the fixed pattern noise or the variation in sensitivity.

In order to realize compensations of the fixed pattern noise and the variations in sensitivity, a current flowing through each pixel of the bolometer infrared image sensor 1 is calculated from the output voltage V100 of the integration circuit and from the emitter voltage of the constant current circuit so as to detect variations in resistance of the individual pixels of the bolometer infrared image sensor 1.

The output voltage V100 of the integration circuit is inversely amplified by the first amplifier 101 and then at the timing of the clamp pulse the reset period of the output voltage V100 of the integration circuit is so set as to clamp the clamp circuit 102 at the lowest voltage in the available input voltage range of the analog-to-digital converter 103.

The signal is then transmitted through the switch SW12 to the analog-to-digital converter 103 so that at the timing of the control pulse to the analog-to-digital converter 103, the signal is analog-to-digital converted by the analog-to-digital converter 103 to generate digital signals. The digital signals are then transmitted into the integration circuit 104 so that the digital signals of several ten frames are integrated for removal of random noises. The integration results are then stored in the first memory 105.

In order to detect the current flowing through the constant current circuit, a constant current circuit is provided which comprises the resistance R14, the transistor Tr14 and the bias voltage source V14. The constant current circuit is the same as a constant current circuit comprising the resistance R13, the transistor Tr13 and the bias voltage source V13 which is equal to V14. In order to calculate accurate bias current value, it is preferable that the resistance value R14 is set to be equal to the resistance value R13 and the transistors 13 and 14 are adjusted to have the same properties for example by use of the one-chip dual matching transistors.

The emitter voltage of the transistor 14 is transmitted through the switch SW12 to the analog-to-digital converter 103 so that the emitter voltage of the transistor 14 is analog-to-digital converted to generate digital signals. The digital signals are then transmitted into the integration circuit 104 so that the digital signals of several ten frames are integrated. The integration results are then stored in the second memory 108.

The data once stored in the first and second memories 105 and 108 are fed to the first and second averaging circuits 106 and 109 for averaging the data. The first and second averaged data are then transmitted from the first and second averaging circuits 106 and 109 to a variation current calculation circuit 107 and a bias current calculation circuit 110 respectively so that the variation current calculation circuit 107 calculates variation current from the output voltage signal V100 whilst the bias current calculation circuit 110 calculates a current from the emitter voltage of the transistor Tr14. Both the calculated currents are then transmitted from the variation current calculation circuit 107 and the bias current calculation circuit 110 into an adder 111 for addition of both the calculated currents thereby calculating a total current which flows through each pixel.

The variation current is given by the following equation which has been obtained by transformation of the equation (2).

$$I12 = V100 C / t \tag{3}$$

where V100 is the output of the integration circuit, t is the integration time or the OFF-period of the reset switch control pulse, and C is the capacitance of the integration capacitor C111. The integration time t is the already known value. The output V100 of the integration circuit is available from the first memory 105. The calculation of the variation current I12 is made in the variation current calculation circuit 107.

The bias current I13 is calculated as follows. The power voltage is already known. The resistance R14 is also already known. The emitter voltage V14 of the transistor Tr14 is available from the second memory 108. The calculation of the bias current I13 is made in the bias current calculation circuit 110.

If the constant current flowing through the constant current circuit is already known, then it is possible to provide a bias current constant circuit 116 in place of the resistance R14, the transistor Tr14, the bias voltage source V14, the switch SW12, the second memory 108, the second averaging circuit 109 and the bias current calculation circuit 110.

The variation coefficient of each pixel is made from the total current flowing through the each pixel. The variation coefficient Cvary of each pixel is made according to the following equation in the variation coefficient calculation circuit 112.

$$Cvary = \{(Iav/Ipix)1\} \tag{4}$$

where Cvary is the variation coefficient, Iav is the average of the currents flowing through the individual pixels and Ipix is the individual currents flowing through the individual pixels.

Alternatively, calculation of the variation coefficient Cvary may be made by taking a specified pixel as a reference pixel, which is closer to the average value of the individual currents flowing through the individual pixels. In this case the calculation of the variation coefficient Cvary is made in accordance with the following equation.

$$Cvary = \{(Iref/Ipix)1\} \tag{5}$$

where Cvary is the variation coefficient, Iref is the currents flowing through the reference pixel and Ipix is the individual currents flowing through the individual pixels.

With reference to the waveform of the analog-to-digital converter control pulse for controlling the analog-to-digital converter A/D 103, the variation coefficient is digital-to-analog converted by the digital-to-analog converter 113 so that the timing of change of the output from the digital-to-analog converter 113 is in the ON-period of the reset switch control pulse for controlling switching operations of the reset switch SW11. The analog signal is then adjusted in its gain value. The current flowing through the each pixel is determined from a relationship between the emitter voltage of the integration transistor Tr11 and the resistance RB of the bolometer infrared image sensor 1, for which reason the variation coefficient is proportional to the emitter voltage of the integration transistor Tr11.

Since, however, it is intended that the variation coefficient is fed back to the base voltage V11 of the integration transistor Tr11, it is necessary to consider the base-emitter voltage Vbetr11, for which reason the variation coefficient of each pixel is multiplexed with the emitter voltage of the integration transistor Tr11 to obtain an amount of the feed back before the variation coefficient is fed back to the base voltage V11 of the integration transistor Tr11.

The analog signal is then transmitted through a second amplifier 114 into a multiplier 115. Another input of the multiplier 115 is connected to the emitter-follower circuit which comprises a resistance R15, a transistor Tr15. The collector of the transistor Tr15 is connected to the high voltage line Vdd. The emitter of the transistor Tr15 is connected to the other input of the multiplier 115. The base of the transistor Tr15 is connected to a bias power source V15. The base voltage V15 of the transistor Tr15 is the same as the base voltage of the integration transistor Tr11. The resistance R15 is connected between the emitter of the transistor Tr15 and the ground line.

In order to provide accurate emitter voltage of the integration transistor Tr11, it is preferable that the resistance value R15 is set to be equal to the resistance value RB of the bolometer infrared image sensor 1 and the transistors 11 and 15 are adjusted to have the same properties for example by use of the one-chip dual matching transistors.

An output of the multiplier 115 is transmitted through a capacitor C12 to a base of the integration transistor Tr11 for execution of feed-back control.

The above feed back control allows that independently from the variations of the resistance RB for the individual pixels of the bolometer infrared image sensor 1, a constant current flows through the pixels whereby the output V100 of the integration circuit is free from the pixel pattern noise. Thereafter, it is possible to rise the gain of the amplifier 101 for effective use of the dynamic range.

The compensation for variation in the sensitivity of the bolometer infrared image sensor 1 will subsequently be described.

The resistance RB? of the bolometer infrared image sensor 1 after inputted with a power is given by the following equation.

$$RB? = RB(1+T) \quad (6)$$

where is the temperature coefficient and T is the variation coefficient of the diagram temperature.

Assuming that the temperature coefficient and the variation coefficient T of the diagram temperature are uniform for every pixels, the resistance RB? of the bolometer infrared image sensor 1 after inputted with the power may be expressed by the following equation.

$$RB? = RB(1+A) \quad (7)$$

where A=T.

The feed back operations will be described.

A pixel is set as a reference pixel. The reference pixel has a resistance RX and is applied with a current IX. Assuming that a resistance of a pixel Y is K times larger than the resistance RX and a current flowing through the pixel Y is IY, the current IX and the current IY are given by the following equations.

$$IX = (V11 - Vbetr11)/RX \quad (8)$$

$$IY = (V11 - Vbetr11) + (K-1)(V15 - Vbetr15)/KRX \quad (9)$$

where V11=V15, Vbetr11=Vbetr15, for which reason IY may be represented by the following equation. Since feed back control is made, IX=IY.

$$IY = K(V11 - Vbetr11)/KRX \quad (9)$$

Further, the current IXP flowing through the pixel X, after the power is applied, and the current IYP flowing through the pixel Y, after the power is applied, are represented by the following equations.

$$IXP = (V11 - Vbetr11)/RX(1+A) \quad (10)$$

$$IYP = K(V11 - Vbetr11)/KRX(1+A) \quad (11)$$

Namely, after the power is applied, the relationship of IXP=IYP is kept.

In the prior art, if the resistance RB of the sensor 1 is dispersed before the power is applied, then the variation in the resistance RB? of the sensor 1 is increased after the power is applied whereby the sensitivity has a large variation.

By contrast, in accordance with the present invention, under the uniform infrared input condition, data are obtained to control the base voltage of the integration transistor Tr11 at a constant voltage level so that the output V100 of the integration circuit 1000 remains constant independently from variations in the resistance RB of the sensor thereby conducting the compensation of the sensitivity variation.

A second embodiment according to the present invention will be described with reference to FIG. 4, wherein provision is made of a novel infrared image sensor with an improved compensation circuit for compensating both the variations in level of the biases for every elements and variations in sensitivity for every elements only by obtaining data one time under uniform infrared ray input conditions. Namely, under the uniform infrared input condition, variations in resistance of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

Figure 4:
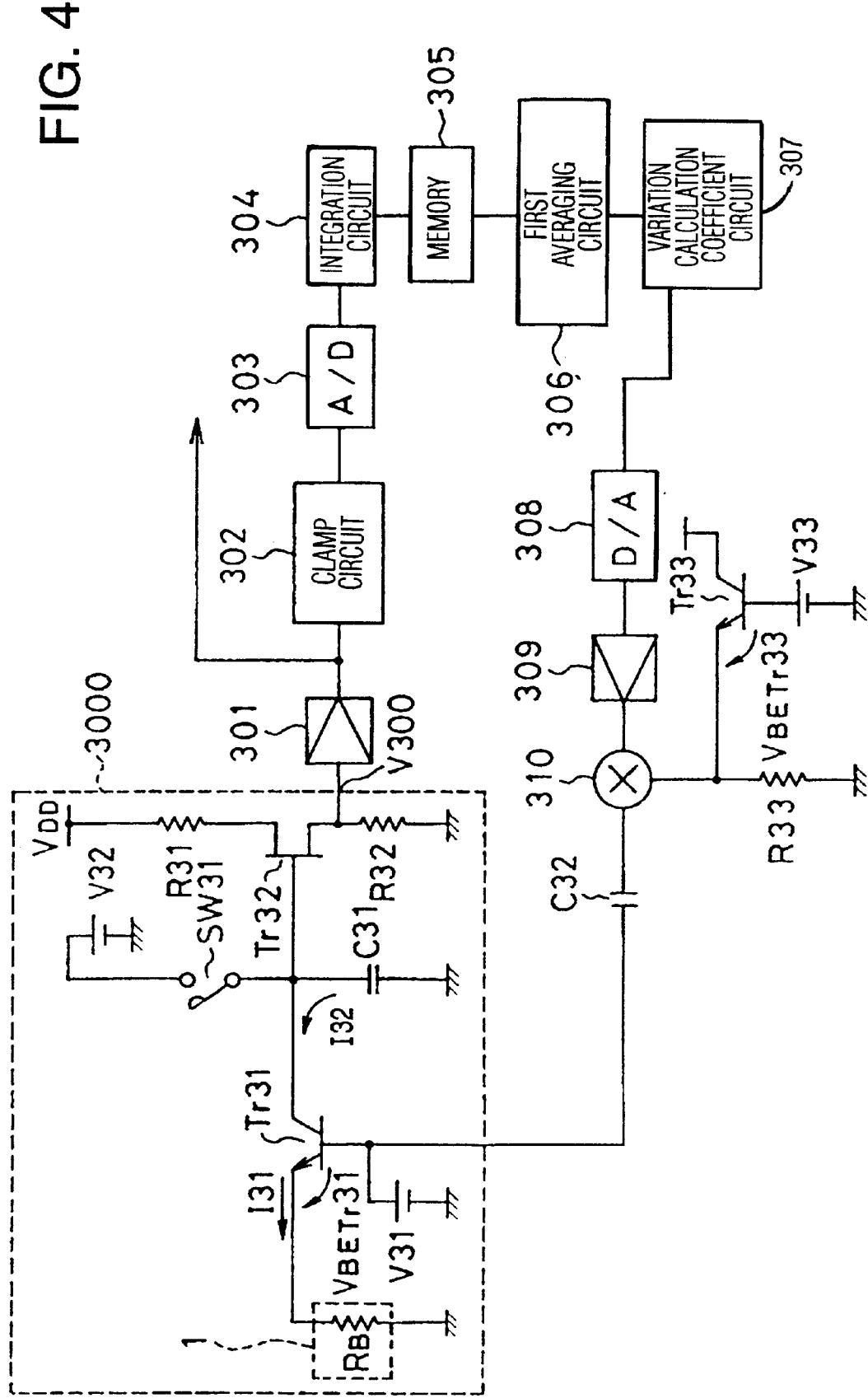
FIG. 4 is circuit diagram illustrative of a compensation circuit for bolometer infrared image sensors in a second embodiment according to the present invention.

As illustrated in FIG. 4, the compensation circuit for compensating both the variations in level of the biases for every element and variations in sensitivity for every element only by obtaining data one time under uniform infrared ray input conditions comprises an integration circuit 3000 for reading out signals from a bolometer infrared image sensor 1, a single memory device 305 for storing the read-out signals, and a variation coefficient calculation circuit 307 for calculating variation coefficient from the variations in resistance. The calculated variation coefficient is fed back to the integration circuit 3000.

Variations in resistance of individual pixels of the bolometer infrared image sensor 1 are calculated from output voltages from the integration circuit 3000 without use of any further measuring circuit.

In the bolometer infrared image sensor 1, the variations in resistance of the individual pixels of the bolometer infrared image sensor 1 are the main factor which cause the fixed pattern noise. Further, since the sensitivity is proportional to the resistance value, the variation in resistance causes the variation in sensitive.

Under the uniform infrared input condition, variations in resistance of the individual pixels of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

Differently from the prior art, it is not required to execute complicated processes such that output data for quantities of two different incident lights which are uniform in plane are fetched. Also it is not required to carry out in the different two processes the compensations of both the variations in level of the biases for every elements and variations in sensitivity for every elements.

With reference to FIG. 4, in the integration circuit 3000, the bolometer infrared image sensor 1 is connected to an emitter of an integration transistor Tr31. Based upon a base voltage V31 of the integration transistor Tr31, a current I31 flows from the emitter to the bolometer infrared image sensor 1.

The current I31 comprises a discharge current I32 which flows to a collector of the integration transistor Tr31 from an integration capacitor C31 which is connected to the collector of the integration transistor Tr31. The potential of the integration capacitor C31 is reset at the same voltage as a reset voltage V32 by a switch 31 during every reset time periods.

A source-follower circuit is provided in the integration circuit 3000. The source-follower circuit comprises a series connection of a resistance R31, a field effect transistor Tr32 and a resistance R32. The resistance R31 is connected between the high voltage line Vdd and the field effect transistor Tr32. The resistance R32 is connected between the ground line Vdd and the field effect transistor Tr32. A gate of the field effect transistor Tr32 is connected to the collector of the integration transistor Tr31.

The integration circuit 3000 comprises the foregoing elements.

An output voltage signal V300 of the integration circuit 3000 is fed to a first amplifier 301 which is connected to an output side of the integration circuit 3000. The output voltage signal V300 is then transmitted through a clamping circuit 302 to an analog-to-digital converter 303 where the output voltage signal V300 is analog-to-digital converted into digital signals. The digital signals are inputted into an integration circuit 304 where signals of several tens of frames are integrated. The integrated results are stored in a first memory 305.

The data once stored in the first memory 305 are then transmitted to first averaging circuit 306 where the data are averaged. The averaged data are then transmitted from the first averaging circuit 306 to a coefficient calculation circuit 307 where variations of the current applied to individual pixels from the averaged value of the currents applied to every pixels are calculated as a variation coefficient.

The variation coefficient is then transmitted into a digital-to-analog converter 308 where the variation coefficient is digital-to-analog converted into an analog signal. The analog signal is then transmitted through a second amplifier 309 into a multiplier 310.

Another input of the multiplier 310 is connected to an emitter-follower circuit which comprises a resistance R33, a transistor Tr33. A collector of the transistor Tr33 is connected to the high voltage line Vdd. An emitter of the transistor Tr33 is connected to the other input of the multiplier 310. A base of the transistor Tr33 is connected to a bias power source V33. A base voltage V33 of the transistor Tr33 is the same as the base voltage of the integration transistor Tr31. The resistance R33 is connected between the emitter of the transistor Tr33 and the ground line.

An output of the multiplier 310 is transmitted through a capacitor C32 to a base of the integration transistor Tr31 for execution of feed-back control.

As described above, the current I31 flowing through the bolometer infrared image sensor comprises only the discharge current from the integration capacitor C31. The output V300 of the integration circuit 3000 is given by the following equation.

$$V300 = I32 t C \quad (12)$$

where I32 is the discharge current of the integration capacitor C31 (I31=I32), t is the integration time or the OFF-period of the reset switch control pulse, and C is the capacitance of the integration capacitor C11.

In this second embodiment, the current I31 flowing through the bolometer infrared image sensor comprises only the discharge current from the integration capacitor C31, for which reason the variations in resistance of the individual pixels of the bolometer infrared image sensor 1 can be obtained.

The current I31 flowing through the bolometer infrared image sensor 1 in FIG. 4 is larger than the current I11 of FIG. 1, for which reason it might be possible that if the amplitude of the output V300 of the integration circuit 3000 is large so that the amplitude thereof extends over the dynamic range of the integration circuit. The gain G of the integration circuit 3000 is given by the following equation.

$$G = t/CRB \quad (13)$$

where t is the integration time or the OFF-period of the reset switch control pulse, RB is the resistance of the bolometer infrared image sensor 1 and C is the capacitance of the integration capacitor C11.

It is possible to settle the above problem with the dynamic range by increasing the capacitance C of the integration capacitor C11 and reducing the amplitude of the gain G of the integration circuit 3000. However, the reduction in the gain G of the integration circuit 3000 raises the other problem with noises of the circuits following the integration circuit against the noises of the integration circuit 3000.

A third embodiment according to the present invention will be described with reference to FIG. 5, wherein provision is made of a novel infrared image sensor with an improved compensation circuit for compensating both the variations in level of the biases for every elements and variations in sensitivity for every elements only by obtaining data one time under uniform infrared ray input conditions. Namely, under the uniform infrared input condition, variations in resistance of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

Figure 5:
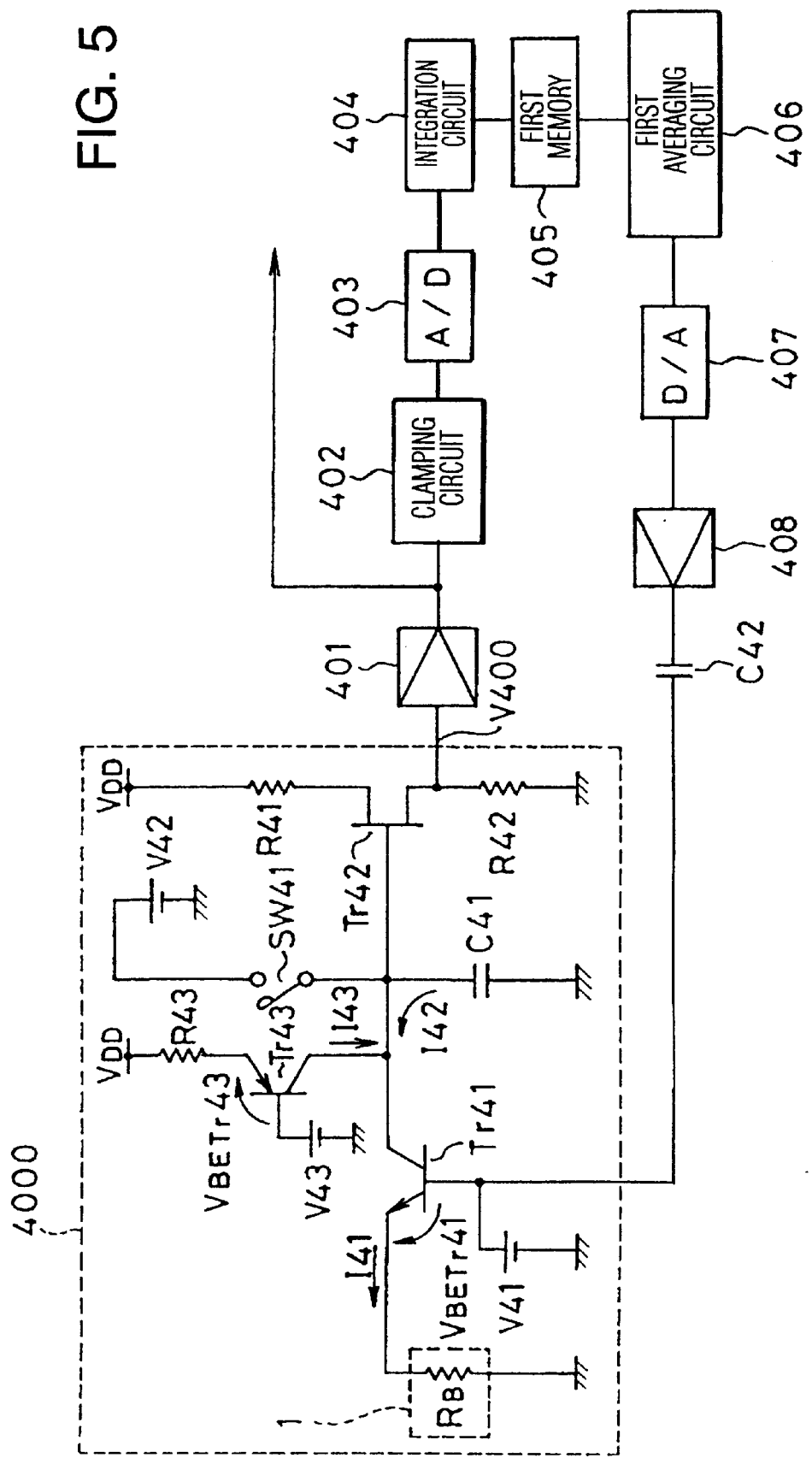
FIG. 5 is a circuit diagram illustrative of a compensation circuit bolometer infrared image sensors in a third embodiment according to the present invention.

As illustrated in FIG. 5, the compensation circuit for compensating both the variations in level of the biases for every elements and variations in sensitivity for every elements only by obtaining data one time under uniform infrared ray input conditions comprises an integration circuit 4000 for reading out signals from a bolometer infrared image sensor 1, and a single memory device 405 for storing the readout signals. The calculated variation coefficient is fed back to the integration circuit 4000.

Variations in resistance of individual pixels of the bolometer infrared image sensor 1 are calculated from output voltages from the integration circuit 4000 without use of any further measuring circuit.

In the bolometer infrared image sensor 1, the variations in resistance of the individual pixels of the bolometer infrared image sensor 1 are the main factor which cause the fixed pattern noise. Further, since the sensitivity is proportional to the resistance value, the variation in resistance causes the variation in sensitive.

Under the uniform infrared input condition, variations in resistance of the individual pixels of the bolometer infrared image sensor are detected as fixed pattern noise compensation signals so that the fixed pattern noise compensation signals are then fed back to a control voltage for controlling a current which flows through the bolometer. As a result, freely from the variations in resistance of individual pixels of the bolometer infrared image sensor, a constant current is applied to carry out compensations of a fixed pattern noise and variation in sensitivity.

Differently from the prior art, it is not required to execute complicated processes such that output data for quantities of two different incident lights which are uniform in plane are fetched. Also it is not required to carry out in the different two processes the compensations of both the variations in level of the biases for every elements and variations in sensitivity for every elements.

With reference to FIG. 5, in the integration circuit, the bolometer infrared image sensor 1 is connected to an emitter of an integration transistor Tr41. Based upon a base voltage V41 of the integration transistor Tr41, a current I41 flows from the emitter to the bolometer infrared image sensor 1.

The current I41 comprises a discharge current I42 and a bias current I43. The discharge current I42 flows to a collector of the integration transistor Tr41 from an integration capacitor C41 which is connected to the collector of the integration transistor Tr41. The bias current I43 flows through a constant current circuit which comprises a series connection of a resistance R43 and a transistor Tr43 to the collector of the integration transistor Tr41. The resistance R43 is connected between a high voltage line Vdd and an emitter of the transistor Tr43. The collector of the transistor Tr43 is connected to the collector of the integration transistor Tr41. A base of the transistor Tr43 is connected to a bias power source V43 for receipt of a bias voltage from the bias power source V43. The potential of the integration capacitor C41 is reset at the same voltage as a reset voltage V42 by a switch 41 during every reset time periods.

A source-follower circuit is provided in the integration circuit 4000. The source-follower circuit comprises a series connection of a resistance R41, a field effect transistor Tr42 and a resistance R42. The resistance R41 is connected between the high voltage line Vdd and the field effect transistor Tr42. The resistance R42 is connected between the ground line Vdd and the field effect transistor Tr42. A gate of the field effect transistor Tr42 is connected to the collector of the integration transistor Tr41.

The integration circuit 4000 comprises the foregoing elements.

An output voltage signal V400 of the integration circuit 4000 is fed to a first amplifier 401 which is connected to an output side of the integration circuit 4000. The output voltage signal V400 is then transmitted through a clamping circuit 402 to an analog-to-digital converter 403 where the output voltage signal V400 is analog-to-digital converted into digital signals. The digital signals are inputted into an integration circuit 404 where signals of several tens of frames are integrated. The integrated results are stored in a first memory 405.

The data once stored in the first memory 405 are then transmitted to first averaging circuit 406 where the data are averaged. The averaged data are then transmitted from the first averaging circuit 406 to a digital-to-analog converter 307 where the variation coefficient is digital-to-analog converted into an analog signal. The analog signal is then transmitted through a second amplifier 308 and a capacitor C42 to a base of the integration transistor Tr41 for execution of feed-back control.

In this third embodiment, the compensation circuit is designed to be simple. Except for bias component of the output V400 of the integration circuit 4000, variations in the resistance of the individual pixels are used as data for the required compensation.

No compensation circuit for compensating the base-emitter voltage Vbetr41 of the integration transistor Tr41 is provided, for which reason even if the variation coefficient calculated is fed back to the base of the integration transistor Tr41, then there still remains an error corresponding to the base-emitter voltage Vbetr41 of the integration transistor Tr41.

Namely, in this third embodiment, except for the bias component, the variations in resistance of the individual pixels or the relative variation component are used to predict the variations in the resistance as absolute value for feed back to the base of the integration transistor Tr41 in the integration circuit 4000 whereby compensations are made for the fixed pattern noise and variations in sensitivity. No further special process is made. For those reasons, it is possible to reduce the size of the circuit.

As a modification of the present invention, it is possible to replace the integration circuit 4000 with the more single integration circuit 3000 illustrated in FIG. 4.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A compensation circuit for infrared sensors in pixels included in an image sensor, said compensation circuit comprising:

a detecting means being connected to said infrared sensor for detecting variations in resistance of said pixels, said detecting means having a controller for controlling a current flowing though said infrared sensor;

a storing means being connected to said detecting means for storing said detected variations in resistance of said pixels as variation data;

a calculating means being connected to said storing means for calculating a variation coefficient for each pixel based upon said variation data; and a multiplexing means being connected to said calculating means for multiplexing said variation coefficient and a reference value having been predetermined to obtain a compensation signal, said multiplexing means being also connected to said controller in said detecting means for transmitting said compensation signal to said controller for feed-back control of said current flowing through said infrared sensor.

2. The compensation circuit as claimed in claim 1, wherein said detecting means comprises:

a reading out circuit being connected to said infrared sensor for reading out output signals for every pixels from said infrared sensor;

an analog-to-digital converter being connected to said reading out circuit for conducting an analog-to-digital conversion of said output signals into digital signals; and an integration circuit being connected to said analog-to-digital converter for integration of said digital signals and said integration circuit being also connected to said storing means.

3. The compensation circuit as claimed in claim 2, wherein said reading out circuit comprises an integration circuit which is connected to said infrared sensor and said controller further comprises a transistor having a base connected to said multiplexing means for receiving said compensation signal from said multiplexing means.

4. The compensation circuit as claimed in claim 2, further comprising a constant current circuit connected through a switch to said analog-to-digital converter, wherein said storing means comprises:

a first memory storing results of integration of said digital signals from said integration circuit when said switch connects said analog-to-digital converter to said reading out circuit; and a second memory storing results of integration of said digital signals from said integration circuit when said switch connects said analog-to-digital converter to said constant current circuit; and wherein said calculating means comprises:

a first averaging circuit connected to said first memory for fetching said results of integration from said first memory and averaging said results;

a second averaging circuit connected to said second memory for fetching said results of integration from said second memory and averaging said results;

a variation current calculating circuit being connected to said first averaging circuit for calculating a variation current based upon said results averaged by said first averaging circuit;

a bias current calculating circuit being connected to said second averaging circuit for calculating a bias current based upon said results averaged by said second averaging circuit;

an adder being connected to said variation current calculating circuit and said bias current calculating circuit for adding said variation current to said bias current to obtain total currents for individual pixels;

a variation coefficient calculating circuit being connected to said adder for calculating variation coefficients of said total currents; and a digital-to-analog converter being connected to said variation coefficient calculating circuit for conducting a digital-to-analog conversion of said variation coefficients into compensation signals, and said digital-to-analog converter being also connected to said multiplexing means.

5. The compensation circuit as claimed in claim 4, wherein said reading out circuit comprises an integration circuit which is connected to said infrared sensor and has said controller and said controller further comprises a transistor having a base connected to said multiplexing means for receiving said compensation signal from said multiplexing means, and further comprising an emitter follower circuit connected to said multiplexing means for supplying said multiplexing means with the same voltage as an emitter voltage of said transistor in said integration circuit.

6. The compensation circuit as claimed in claim 2, wherein said storing means comprises a first memory storing results of integration of said digital signals from said integration circuit, and wherein said calculating means comprises:

a first averaging circuit connected to said first memory for fetching said results of integration from said first memory and averaging said results;

a variation coefficient calculating circuit being connected to said first averaging circuit for calculating variation coefficients of said results of integration averaged; and a digital-to-analog converter being connected to said variation coefficient calculating circuit for conducting a digital-to-analog conversion of said variation coefficients into compensation signals, and said digital-to-analog converter being also connected to said multiplexing means.

7. The compensation circuit as claimed in claim 6, wherein said reading out circuit comprises an integration circuit which is connected to said infrared sensor and said controller further comprises a transistor having a base connected to said multiplexing means for receiving said compensation signal from said multiplexing means, and further comprising an emitter follower circuit connected to said multiplexing means for supplying said multiplexing means with the same voltage as an emitter voltage of said transistor in said integration circuit.

8. A compensation circuit for infrared sensors in pixels included in an image sensor, said compensation circuit comprising:

a detecting means being connected to said infrared sensor for detecting variations in resistance of said pixels, said detecting means having a controller for controlling a current flowing though said infrared sensor;

a storing means being connected to said detecting means for storing said detected variations in resistance of said pixels as variation data to generate a compensation signal; and an averaging means being connected to said storing means for averaging said variation data and said averaging means being also connected to said controller in said detecting means for transmitting said compensation signal to said controller for feed-back control of said current flowing through said infrared sensor.

9. The compensation circuit as claimed in claim 8, wherein said detecting means comprises:

a reading out circuit being connected to said infrared sensor for reading out output signals for every pixels from said infrared sensor;

an analog-to-digital converter being connected to said reading out circuit for conducting an analog-to-digital conversion of said output signals into digital signals; and an integration circuit being connected to said analog-to-digital converter for integration of said digital signals and said integration circuit being also connected to said storing means.

10. The compensation circuit as claimed in claim 9, wherein said reading out circuit comprises an integration circuit which is connected to said infrared sensor and said controller further comprises a transistor having a base connected to said averaging means for receiving said compensation signal from said averaging means.

11. The compensation circuit as claimed in claim 10, further comprising a digital-to-analog converter being connected to said variation coefficient calculating circuit for conducting a digital-to-analog conversion of said variation coefficients into compensation signals, and said digital-to-analog converter being also connected to said base of said transistor serving as said controller.

12. A compensation circuit for infrared sensors in pixels included in an image sensor, said compensation circuit comprising:

a feed back means being connected to said infrared sensor for controlling at a constant value a current flowing through each said pixels of said infrared sensor and for generating output voltage signals for each said pixels by applying said current controlled constant to each said pixels; and a detecting means being connected to said feed back means for detecting variations in said resistance of each said pixels as fixed pattern noises based upon said output voltage signals from said feed back means to generate compensations signals which are to be fed back to said feed back means for feed-back control of said current flowing through said infrared sensor.

13. The compensation circuit as claimed in claim 12, wherein said detecting means comprises:

an analog-to-digital converter being connected to said feed back means for conducting an analog-to-digital conversion of said output voltage signals into digital voltage signals;

an integration circuit being connected to said analog-to-digital converter for integration of said digital voltage signals;

a storing means being connected to said detecting means for storing said integration of said digital voltage signals as variation data;

a variation coefficient calculating means being connected to said storing means for calculating a variation coefficient for each pixel based upon said variation data;

a digital-to-analog converter being connected to said variation coefficient calculating means for conducting a digital-to-analog conversion of said variation coefficients into variation coefficient analog signals; and a multiplexing means being connected to said digital-to-analog converter for multiplexing said variation coefficient analog signals and a reference value having been predetermined to obtain a compensation signal, said multiplexing means being also connected to said feed back means for transmitting said compensation signal to said feed back means.

14. The compensation circuit as claimed in claim 13, wherein said feed back means comprises an integration circuit which is connected to said infrared sensor and said controller further comprises a transistor having a base connected to said multiplexing means for receiving said compensation signal from said multiplexing means, and further comprising an emitter follower circuit connected to said multiplexing means for supplying slid multiplexing means with the same voltage as an emitter voltage of said transistor in said integration circuit.

15. The compensation circuit as claimed in claim 13, further comprising a constant current circuit connected through a switch to said analog-to-digital converter, wherein said storing means comprises:

a fist memory storing results of integration of said digital signals from said integration circuit when said switch connects said analog-to-digital converter to said feed back means; and a second memory storing results of integration of said digital signals from said integration circuit when said switch connects said analog-to-digital converter to said constant current circuit; and wherein said variation coefficient calculating means comprises:

a first averaging circuit connected to said first memory for fetching said results of integration from said first memory and averaging said results;

a second averaging circuit connected to said second memory for fetching said results of integration from said second memory and averaging said results;

a variation current calculating circuit being connected to said first averaging circuit for calculating a variation current based upon said results averaged by said first averaging circuit;

a bias current calculating circuit being connected to said second averaging circuit for calculating a bias current based upon said results averaged by said second averaging circuit;

an adder being connected to said variation current calculating circuit and said bias current calculating circuit for adding said variation current to said bias current to obtain total currents for individual pixels; and a variation coefficient calculating circuit being connected to said adder for calculating variation coefficients of said total currents.

16. The compensation circuit as claimed in claim 13, wherein said storing means comprises a first memory storing results of integration of said digital signals from said integration circuit, and wherein said calculating means comprises:

a first averaging circuit connected to said first memory for fetching said results of integration from said first memory and averaging said results; and a variation coefficient calculating circuit being connected to said first averaging circuit for calculating variation coefficients of said results of integration averaged.

17. The compensation circuit as claimed in claim 12, wherein said detecting means comprises:

an analog-to-digital converter being connected to said feed back means for conducting an analog-to-digital conversion of said output voltage signals into digital voltage signals;

an integration circuit being connected to said analog-to-digital converter for integration of said digital voltage signals;

a storing means being connected to said detecting means for storing said integration of said digital voltage signals as variation data; and an averaging means being connected to said storing means for averaging said variation data; and a digital-to-analog converter being connected to said averaging means for conducting a digital-to-analog conversion of said averaged variation data into analog signals, and said digital-to-analog converter being also connected to said feed back means.

18. The compensation circuit as claimed in claim 17, wherein said feed back means comprises an integration circuit which is connected to said infrared sensor and said controller further comprises a transistor having a base connected to said digital-to-analog converter.

19. An image sensor comprising:

a plurality of pixels, each of which includes a bolometer infrared image sensor;

a detecting means being connected to said iced image sensor for detecting variations in resistance of said pixels, said detecting means having a controller for controlling a current flowing though said infrared image sensor;

a storing means being connected to said detecting means for storing said detected variations in resistance of said pixels as variation data;

a calculating means being connected to said storing means for calculating a variation coefficient for each pixel based upon said variation data; and a multiplexing means being connected to said calculating means for multiplexing said variation coefficient and a reference value having been predetermined to obtain a compensation signal, said multiplexing means being also connected to said controller in said detecting means for transmitting said compensation signal to said controller for feed-back control of said current flowing through said infrared image sensor.

20. The image sensor as claimed in claim 19, wherein said detecting means comprises:

a reading out circuit being connected to said infrared image sensor for reading out output signals for every pixels from said inked image sensor;

an analog-to-digital converter being connected to said reading out circuit for conducting an analog-to-digital conversion of said output signals into digital signals; and an integration circuit being connected to said analog-to-digital converter for integration of said digital signals and said integration circuit being also connected to said storing means.

21. The image sensor as claimed in claim 20, wherein said reading out circuit comprises an integration circuit which is connected to said infrared image sensor and said controller further comprises a transistor having a base connected to said multiplexing means for receiving said compensation signal from said multiplexing means.

22. The image sensor as claimed in claim 20, further comprising a constant current circuit connected through a switch to said analog-to-digital converter, wherein said storing means comprises:

a first memory storing results of integration of said digital signals from said integration circuit when said switch connects said analog-to-digital converter to said reading out circuit; and a second memory storing results of integration of said digital signals from said integration circuit when said switch connects said analog-to-digital converter to said constant current circuit; and wherein said calculating means comprises:

a first averaging circuit connected to said first memory for fetching said results of integration from said first memory and averaging said results;

a second averaging circuit connected to said second memory for fetching said results of integration from said second memory and averaging said results;

a variation current calculating circuit being connected to said first averaging circuit for calculating a variation current based upon said results averaged by said first averaging circuit;

a bias current calculating circuit being connected to said second averaging circuit for calculating a bias current based upon said results averaged by said second averaging circuit;

an adder being connected to said variation current calculating circuit and said bias current calculating circuit for adding said variation current to said bias current to obtain total currents for individual pixels;

a variation coefficient calculating circuit being connected to said adder for calculating variation coefficients of said total currents; and a digital-to-analog converter being connected to said variation coefficient calculating circuit for conducting a digital-to-analog conversion of said variation coefficients into compensation signals, and said digital-to-analog converter being also connected to said multiplexing means.

23. The image sensor as claimed in claim 22, wherein said reading out circuit comprises an integration circuit which is connected to said infrared image sensor and has said controller and said controller further comprises a transistor having a base connected to said multiplexing means for receiving said compensation signal from said multiplexing means, and further comprising an emitter follower circuit connected to said multiplexing means for supplying said multiplexing means with the same voltage as an emitter voltage of said transistor in said integration circuit.

24. The image sensor as claimed in claim 20, wherein said storing means comprises a first memory storing results of integration of said digital signals from said integration circuit, and wherein said calculating means comprises:

a first averaging circuit connected to said first memory for fetching said results of integration from said first memory and averaging said results;

a variation coefficient calculating circuit being connected to said first averaging circuit for calculating variation coefficients of said results of integration averaged; and a digital-to-analog converter being connected to said variation coefficient calculating circuit for conducting a digital-to-analog conversion of said variation coefficients into compensation signals, and said digital-to-analog converter being also connected to said multiplexing means.

25. The image sensor as claimed in claim 24, wherein said reading out circuit comprises an integration circuit which is connected to said infrared image sensor and said controller further comprises a transistor having a base connected to said multiplexing means for receiving said compensation signal from said multiplexing means, and further comprising an emitter follower circuit connected to said multiplexing means for supplying said multiplexing means with the same voltage as an emitter voltage of said transistor in said integration circuit.

26. An image sensor comprising:

a plurality of pixels, each of which includes a bolometer infrared image sensor;

a detecting means being connected to said infrared image sensor for detecting variations in resistance of said pixels, said detecting means having a controller for controlling a current flowing though said infrared image sensor;

a storing means being connected to said detecting means for storing said detected variations in resistance of said pixels as variation data to generate a compensation signal; and an averaging means being connected to said storing means for averaging said variation data and said averaging means being also connected to said controller in said detecting means for transmitting said compensation signal to said controller for feed-back control of said current flowing through said infrared image sensor.

27. The image sensor as claimed in claim 26, wherein said detecting means comprises:

a reading out circuit being connected to said infrared image sensor for reading out output signals for every pixels from said infrared image sensor;

an analog-to-digital converter being connected to said reading out circuit for conducting an analog-to-digital conversion of said output signals into digital signals; and an integration circuit being connected to said analog-to-digital converter for integration of said digital signals and said integration circuit being also connected to said storing means.

28. The image sensor as claimed in claim 27, wherein said reading out circuit comprises an integration circuit which is connected to said infrared image sensor and said controller further comprises a transistor having a base connected to said averaging means for receiving said compensation signal from said averaging means.

29. The image sensor as claimed in claim 28, further comprising a digital-to-analog converter being connected to said variation coefficient calculating circuit for conducting a digital-to-analog conversion of said variation coefficients into compensation signals, and said digital-to-analog converter being also connected to said base of said transistor serving as said controller.

30. An image sensor comprising:

a plurality of pixels, each of which includes a bolometer infrared image sensor;

a feed back means being connected to said infrared image sensor for controlling at a constant value a current flowing through each said pixels of said infrared image sensor and for generating output voltage signals for each said pixels by apply said current controlled constant to each said pixels; and a detecting means being connected to said feed back means for detecting variations in said resistance of each said pixels as fixed pattern noises based upon said output voltage signals from said feed back means to generate compensations signals which are to be fed back to said feed back means for feed-back control of said current flowing through said infrared image sensor.

31. The image sensor as claimed in claim 30, wherein said detecting means comprises:

an analog-to-digital converter being connected to said feed back means for conducting an analog-to-digital conversion of said output voltage signals into digital voltage signals;

an integration circuit being connected to said analog-to-digital converter for integration of said digital voltage signals;

a storing means being connected to said detecting means for storing said integration of said digital voltage signals as variation data;

a variation coefficient calculating means being connected to said storing means for calculating a variation coefficient for each pixel based upon said variation data;

a digital-to-analog converter being connected to said variation coefficient calculating means for conducting a digital-to-analog conversion of said variation coefficients into variation coefficient analog signals; and a multiplexing means being connected to said digital-to-analog converter for multiplexing said variation coefficient analog signals and a reference value having been predetermined to obtain a compensation signal, said multiplexing means being also connected to said feed back means for transmitting said compensation signal to said feed back means.

32. The image sensor as claimed in claim 31, wherein said feed back means comprises an integration circuit which is connected to said infrared image sensor and said controller further comprises a transistor having a base connected to said multiplexing means for receiving said compensation signal from said multiplexing means, and further comprising an emitter follower circuit connected to said multiplexing means for supplying said multiplexing means with the same voltage as an emitter voltage of said transistor in said integration circuit.

33. The image sensor as claimed in claim 31, further comprising a constant current circuit connected though a switch to said analog-to-digital converter, wherein said storing means comprises:

a first memory storing results of integration of said digital signals from said integration circuit when said switch connects said analog-to-digital converter to said feed back means; and a second memory storing results of integration of said digital signals from said integration circuit when said switch connects said analog-to-digital converter to said constant current circuit; and wherein said variation coefficient calculating means comprises:

a first averaging circuit connected to said first memory for fetching said results of integration from said first memory and averaging said results;

a second averaging circuit connected to said second memory for fetching said results of integration from said second memory and averaging said results;

a variation current calculating circuit being connected to said first averaging circuit for calculating a variation current based upon said results averaged by said first averaging circuit;

a bias current calculating circuit being connected to said second averaging circuit for calculating a bias current based upon said results averaged by said second averaging circuit;

an adder being connected to said variation current calculating circuit and said bias current calculating circuit for adding said variation current to said bias current to obtain total currents for individual pixels; and a variation coefficient calculating circuit being connected to said adder for calculating variation coefficients of said total currents.

34. The image sensor as claimed in claim 31, wherein said storing means comprises a first memory storing results of integration of said digital signals from said integration circuit, and wherein said calculating means comprises:

a first averaging circuit connected to said first memory for fetching said results of integration from said first memory and averaging said results; and a variation coefficient calculating circuit being connected to said first averaging circuit for calculating variation coefficients of said results of integration averaged.

35. The image sensor as claimed in claim 30, wherein said detecting means comprises:

an analog-to-digital converter being connected to said feed back means for conducting an analog-to-digital conversion of said output voltage signals into digital voltage signals;

an integration circuit being connected to said analog-to-digital converter for integration of said digital voltage signals;

a storing means being connected to said detecting means for storing said integration of said digital voltage signals as variation data; and an averaging means being connected to said storing means for averaging said variation data; and a digital-to-analog converter being connected to said averaging means for conducting a digital-to-analog conversion of said averaged variation data into analog signals, and said digital-to-analog converter being also connected to said feed back means.

36. The image sensor as claimed in claim 35, wherein said feed back means comprises an integration circuit which is connected to said infrared image sensor and said controller further comprises a transistor having a base connected to said digital-to-analog converter.

* * * * *